US008608385B2

(12) United States Patent
Ovares et al.

(10) Patent No.: US 8,608,385 B2
(45) Date of Patent: Dec. 17, 2013

(54) MAIN BEARING FOR ENGINE WITH HIGH BELT LOAD

(75) Inventors: Paul Matthew Ovares, Brownstown, MI (US); Robert Karl Sturk, Plymouth, MI (US)

(73) Assignee: Federal-Mogul Corporation, Southfield, MI (US)

( * ) Notice: Subject to any disclaimer, the term of this patent is extended or adjusted under 35 U.S.C. 154(b) by 161 days.

(21) Appl. No.: 13/110,482

(22) Filed: May 18, 2011

(65) Prior Publication Data

US 2012/0294558 A1    Nov. 22, 2012

(51) Int. Cl.
*F16C 9/04*    (2006.01)

(52) U.S. Cl.
USPC ............ 384/288; 384/283; 384/286; 384/291; 384/294

(58) Field of Classification Search
USPC .................. 384/283, 286, 288, 291, 294, 429
See application file for complete search history.

(56) References Cited

U.S. PATENT DOCUMENTS

| 785,243 | A | * | 3/1905 | Weiss | 384/290 |
|---|---|---|---|---|---|
| 2,158,835 | A | * | 5/1939 | Schmidt | 384/291 |
| 2,631,905 | A | * | 3/1953 | Coppen | 384/291 |
| 2,673,767 | A | | 3/1954 | Schoeppner | |
| 2,901,297 | A | * | 8/1959 | Sternlicht | 384/291 |
| 2,940,802 | A | | 6/1960 | Love | |
| 3,386,783 | A | | 6/1968 | Scheufler | |
| 3,449,028 | A | | 6/1969 | De Hart | |
| 4,105,267 | A | | 8/1978 | Mori | |
| 4,567,815 | A | | 2/1986 | Kocher | |
| 5,333,955 | A | | 8/1994 | Papa | |
| 6,481,895 | B2 | | 11/2002 | Yang et al. | |
| 6,491,438 | B1 | | 12/2002 | Ono et al. | |
| 6,585,419 | B2 | | 7/2003 | Ono et al. | |
| 6,634,791 | B2 | | 10/2003 | Ono et al. | |
| 6,729,763 | B2 | * | 5/2004 | Post et al. | 384/213 |
| 6,991,377 | B2 | | 1/2006 | Yamamoto et al. | |
| 7,165,889 | B2 | | 1/2007 | Light et al. | |

(Continued)

FOREIGN PATENT DOCUMENTS

| CN | 201027794 Y | * | 2/2008 |
|---|---|---|---|
| GB | 1365738 A | | 9/1974 |
| JP | 2003139125 A | | 5/2003 |

OTHER PUBLICATIONS

CN 201027794 Y—Machine Translation.*

(Continued)

*Primary Examiner* — Richard W Ridley
*Assistant Examiner* — William Santosa
(74) *Attorney, Agent, or Firm* — Robert L. Stearns; Dickinson Wright, PLLC (57) ABSTRACT

A main bearing (20) for supporting a rotating crankshaft (56) includes an upper shell (22) and a lower shell (24). An upper inner surface (32) of the upper shell (22) has an oil supply groove (26) extending circumferentially therealong, an oil stem groove (28) extending obliquely from the oil supply groove (26), and a pair of oil distribution grooves (30) extending from the oil stem groove (28) along and parallel to the oil supply groove (26) to present an F-shape along the upper inner surface (32) of the main bearing (20). The oil grooves (26, 28, 30) provide for improved lubrication of the main bearing (20) at startup and when the engine is idle or stopped, especially in electric and hybrid vehicles. The main bearing (20) also has exceptional strength and load bearing capacity.

19 Claims, 6 Drawing Sheets

(56) References Cited

U.S. PATENT DOCUMENTS

| | | | |
|---|---|---|---|
| 7,258,489 B2 * | 8/2007 | Welch et al. | 384/273 |
| 2003/0179966 A1 | 9/2003 | Hojo et al. | |
| 2005/0201647 A1 * | 9/2005 | Kuroda et al. | 384/291 |
| 2008/0112658 A1 | 5/2008 | Justin | |
| 2008/0187259 A1 * | 8/2008 | Ishigo et al. | 384/294 |

OTHER PUBLICATIONS

International Search Report PCT/US2012/038053 mailed on Jul. 31, 2012.

* cited by examiner

MAIN BEARING FOR ENGINE WITH HIGH BELT LOAD

BACKGROUND OF THE INVENTION

1. Field of the Invention

This invention relates generally to bearings for internal combustion engines and, more particularly, to main bearings including grooves for containing lubricating oil.

2. Description of the Prior Art

Main bearings support a rotating crankshaft of an internal combustion engine. Such bearings are subject to various loads, depending on the configuration of the engine, for example radial loads due to accessory belt tensions and thrust loads due to combustion pressures. As the crankshaft rotates, significant wear can develop along the inner surface of the main bearing. To reduce wear, internal combustion engines have been designed to include an oil pump supplying lubricating oil to the inner surface of the main bearing. Main bearings have also been designed to include an oil groove extending circumferentially along the inner surface to distribute the lubricating oil along the length of the inner surface. However, when the engine idles or stops, so does the oil pump, and the lubricating oil drains off the inner surface. Thus, the crankshaft is pressed against an inadequately lubricated inner surface, causing significant wear on the inner surface.

When the engine restarts, so does the oil pump, and lubricating oil is again supplied to the inner surface of the main bearing. However, there is a short delay before the lubricating oil is adequately distributed along the inner surface. Thus, for a short period of time, the crankshaft rotates on the inadequately lubricated inner surface, also causing wear on the inner surface. This delay is especially problematic in engines that stop and start frequently, such as engines of hybrid and electric vehicles, as the repeated starting and stopping incurs repeated delays, causing significant wear over time. In addition, crankshafts of hybrid and electric vehicles rotate at higher than normal speeds at startup, relative to crankshafts of conventional vehicles, creating a greater amount of wear on the main bearing.

In attempt to improve lubrication of the inner surface of the main bearing at engine startup, main bearings have been designed to include supplemental oil grooves, in addition to the circumferential oil groove. An example of such a main bearing is disclosed in U.S. Pat. No. 6,491,438 to Ono et. al. The main bearing disclosed in the Ono patent includes a plurality of branch oil grooves extending obliquely from a circumferential oil groove. When the engine is running, lubricating oil is pumped into the circumferential oil groove. The lubricating oil flows to the branch grooves and along the inner surface of the main bearing. When the engine idles or stops, the lubricating oil drains from the main bearing surface, but some of the lubricating oil is maintained in the branch oil grooves. When the engine restarts, the lubricating oil flows out of the branch oil grooves to the inner surface, according to rotation of the crankshaft. Thus, the inner surface of the main bearing is provided with some lubrication at startup, before a greater amount of lubricating oil from the oil pump reaches the inner surface.

However, in certain applications, the branch oil grooves of the Ono patent do not provide adequate lubrication between the crankshaft and the inner surface when the engine is idle or stopped, or at startup. In addition, the branch oil grooves of the Ono patent significantly reduce the non-grooved surface area of the main bearing, which reduces strength and load carrying capacity of the main bearing.

SUMMARY OF THE INVENTION

In summary, the invention provides for a main bearing of an internal combustion engine. The main bearing includes an upper shell including an upper inner surface extending circumferentially between a first shell end and a second shell end, and a lower shell including a lower inner surface extending circumferentially between a third shell end and a forth shell end. The first shell end of the upper shell abuts the third shell end of the lower shell, and the second shell end of the upper shell abuts the forth shell end of the lower shell. The shells include an oil supply groove extending circumferentially along the inner surfaces. The upper shell also includes an oil stem groove extending obliquely from the oil supply groove, and at least one oil distribution groove extending from the oil stem groove along the oil supply groove.

The oil grooves of the main bearing can be disposed in an area typically prone to high wear, which depends on engine configuration, but can include an area in direct contact with the crankshaft when the engine is idle or stopped. When the engine is running, the lubricating oil is supplied by an oil pump to the oil supply groove of the main bearing. The lubricating oil flows from the oil supply groove to the oil stem groove, oil distribution groove, and over the upper inner surface. The oil stem groove and oil distribution groove direct a significant amount of lubricating oil to the area prone to high wear.

When the engine idles or stops, the lubricating oil slowly drains off the inner surfaces of the shells. However, a residual amount of lubricating oil will remain in all the grooves, unless the engine is stopped for a substantial amount of time, in which case the lubricating oil only remains in the oil supply groove of the lower shell. The lubricating oil retained in the oil stem groove and the oil distribution groove of the upper shell lubricates the area prone to high wear when the engine is idle or stopped.

At startup, or when the engine restarts, the rotation of the crankshaft draws the lubricating oil maintained in the oil supply groove of the lower shell to the upper inner surface. The lubricating oil drawn to the upper inner surface will flow into the oil stem groove and oil distribution groove, and the grooves will immediately direct the lubricating oil to the area of high wear. Thus, the area of high wear is adequately lubricated while the engine idles or stops and at startup, without delay.

In addition, the orientation of the oil grooves is such that a non-grooved surface area, which is the surface area of the main bearing without the oil grooves, is maximized. The configuration of the oil grooves allows the main bearing to have a greater non-grooved surface area than prior art main bearings having other oil groove configurations. The non-grooved surface area allows the main bearing to maintain exceptional strength and load bearing capacity, while providing exceptional lubrication.

Thus, the main bearing experiences less wear and has a longer useful life, relative to main bearings of the prior art including oil grooves having other configurations. The advantage of adequate lubrication at startup is especially beneficial when the main bearing is used in hybrid and electric vehicles because the engines of those vehicles frequently start and stop. Adequate lubrication at startup is also especially beneficial in hybrid and electric vehicles because the crankshafts of those vehicles rotate at higher speeds at startup, compared to crankshafts of conventional vehicles.

DETAILED DESCRIPTION OF THE ENABLING EMBODIMENTS

Figure 1:
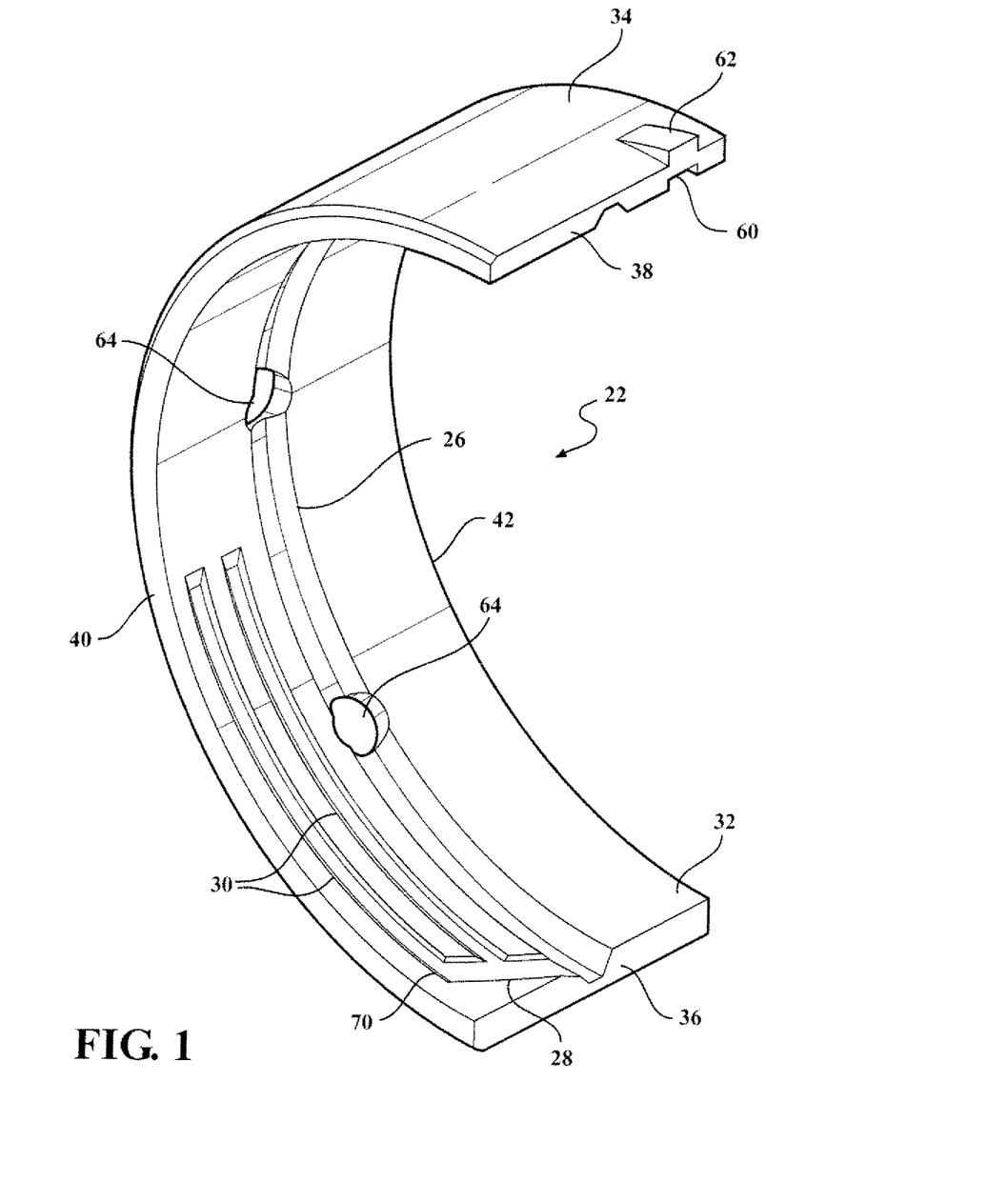
FIG. 1 is a perspective view of an upper shell of a main bearing according to an exemplary embodiment.
Figure 2:
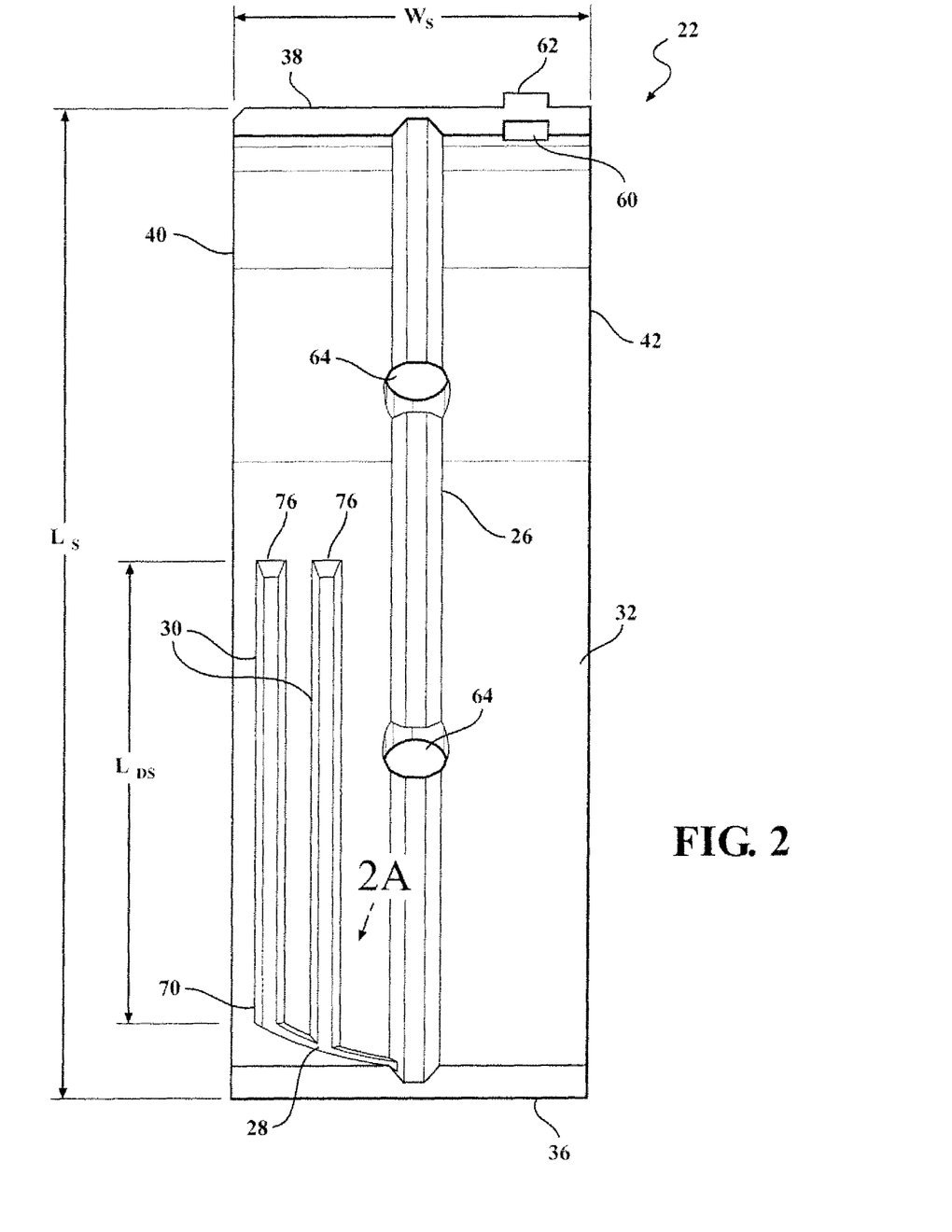
FIG. 2 is a plan view of the upper shell of FIG. 1.
Figure 2A:
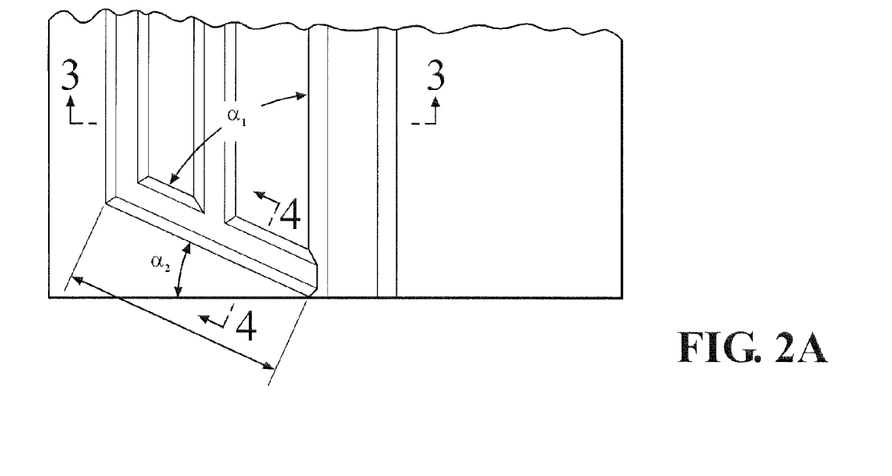

A main bearing 20 of an internal combustion engine includes an upper shell 22 and a lower shell 24. The upper shell 22 has an oil supply groove 26 extending circumferentially therealong, an oil stem groove 28 extending obliquely from the oil supply groove 26, and at least one oil distribution groove 30 extending from the oil stem groove 28 along the oil supply groove 26. In an exemplary embodiment, the upper shell 22 includes a pair of the oil distribution grooves 30 each extending along the oil supply groove 26 so that together the oil grooves 26, 28, 30 present an F-shape, as shown in FIGS. 1 and 2. The oil grooves 26, 28, 30 store lubricating oil (not shown) and provide for improved lubrication of the main bearing 20 at startup and when the engine is idle or stopped, compared to main bearings 20 of the prior art without oil grooves or including oil grooves having other configurations. Another advantage is that the non-grooved surface area of the upper inner surface 32 can be maximized, while the oil grooves 26, 28, 30 still maintain enough lubricating oil to provide adequate lubrication at startup and when the engine is idle or stopped. The high non-grooved surface area allows the main bearing 20 to maintain exceptional strength and load bearing capacity.

Figure 3:
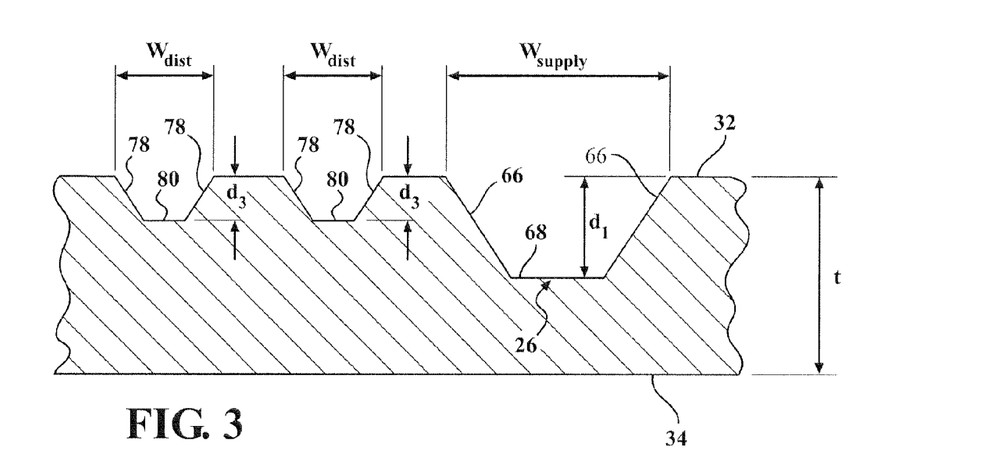
FIG. 3 is a cross-sectional view of the upper shell of FIG. 2 in the direction of arrows 3 showing a profile of an oil supply groove and oil distribution grooves.
Figure 4:
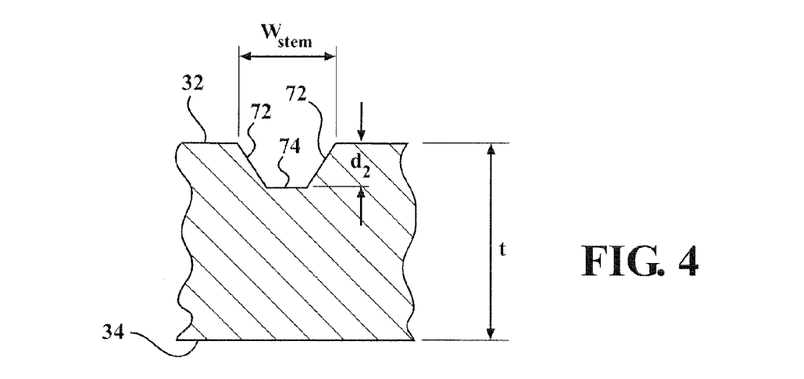
FIG. 4 is a cross-sectional view of the upper shell of FIG. 2 in the direction of arrows 4 showing a profile of an oil stem groove of the upper shell.

As shown in FIG. 1, the upper shell 22 of the main bearing 20 has an upper outer surface 34 and an upper inner surface 32 extending between a first shell end 36 and a second shell end 38 opposite the first shell end 36. The upper shell 22 presents a shell thickness t extending from the upper outer surface 34 to the upper inner surface 32, as shown in FIGS. 3 and 4. The shell thickness t and other dimensions of the main bearing 20 can vary depending on the engine design and area of high wear. In the exemplary embodiment, the shell thickness t in the non-grooved area, i.e. the area without the oil grooves 26, 28, 30 is about 2.0 millimeters to 6.0 millimeters, preferably about 3.0 millimeters. The upper shell 22 presents a shell length $L_s$ extending circumferentially from the first shell end 36 to the second shell end 38, as shown in FIG. 2. In the exemplary embodiment, the shell length $L_s$ is about 50 millimeters to about 90 millimeters, preferably about 70 millimeters. The upper shell 22 extends radially between a first side edge 40 and a second side edge 42 and presents a shell width $W_s$ therebetween. In the exemplary embodiment, the shell width $W_s$ is about 10 millimeters to about 40 millimeters, preferably about 23 millimeters.

Figure 5:
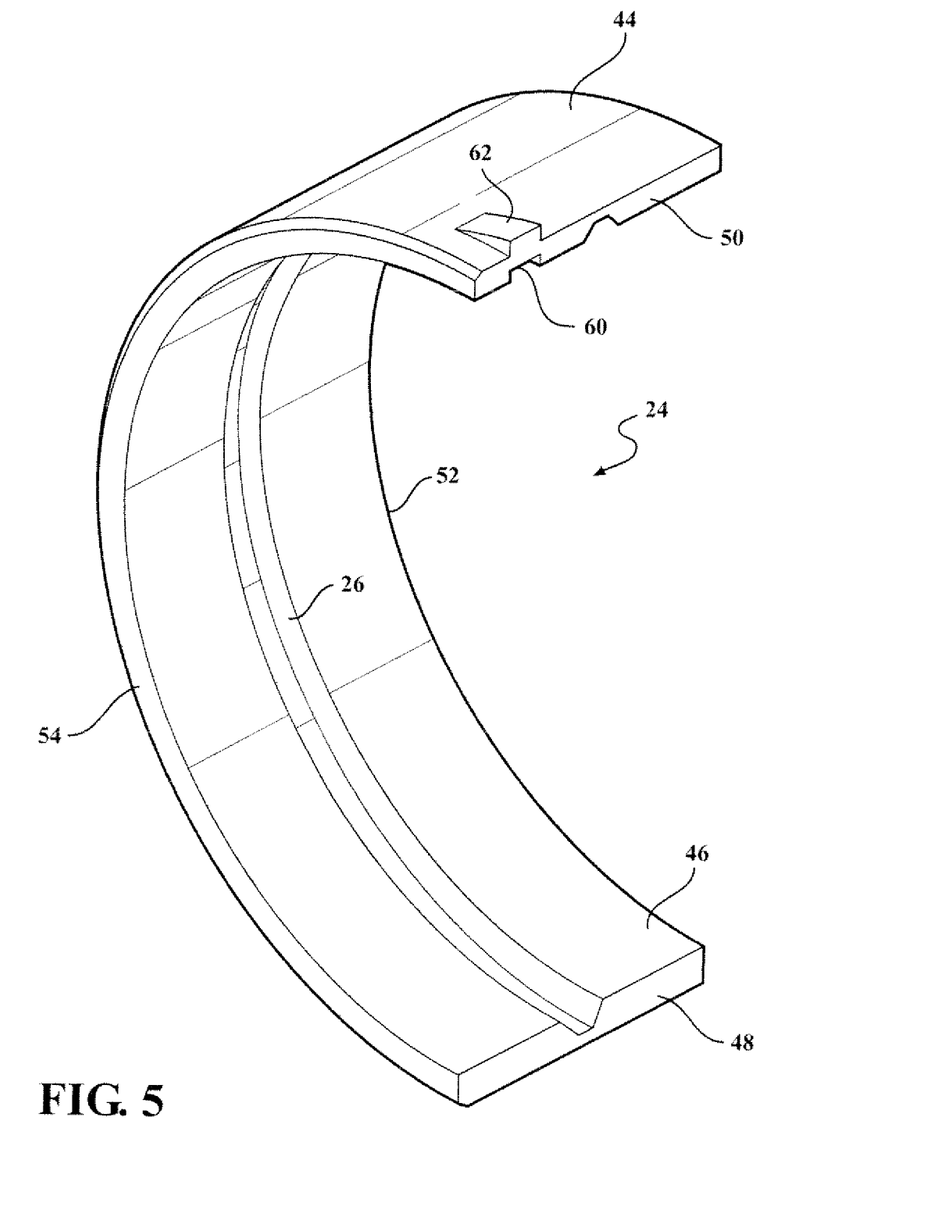
FIG. 5 is a perspective view of a lower shell of a main bearing.
Figure 6:
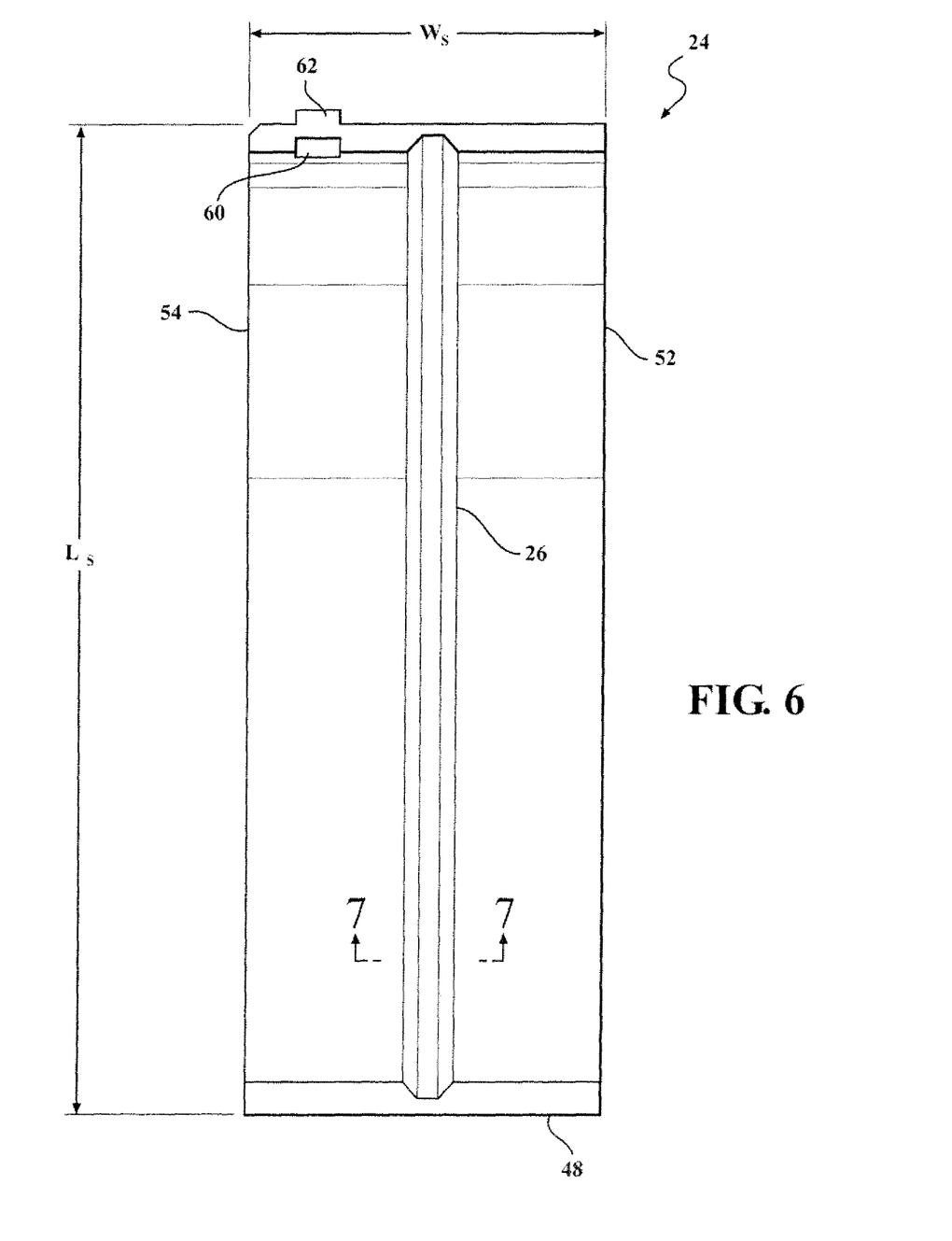
FIG. 6 is a plan view of the lower shell of FIG. 5.
Figure 7:
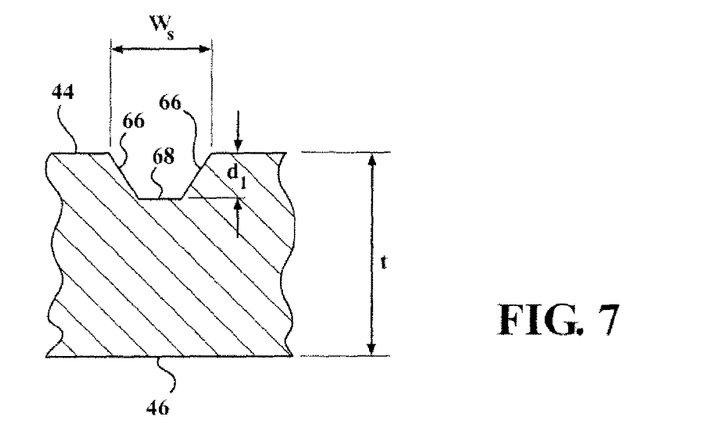
FIG. 7 is a cross-sectional view of the lower shell of FIG. 6 in the direction of arrows 7 showing a profile of an oil supply groove.

As shown in FIG. 5, the lower shell 24 has a lower outer surface 44 and a lower inner surface 46 extending between a third shell end 48 and a forth shell end 50 opposite the third shell end 48. The lower shell 24 extends radially between a third side edge 52 and a forth side edge 54 and presents a shell width $W_s$ therebetween. As shown in FIG. 7, the lower shell 24 presents a shell thickness t extending from the lower outer surface 44 to the lower inner surface 46. As shown in FIG. 6, the lower shell 24 presents a shell length $L_s$ extending from the third shell end 48 to the forth shell end 50 and a shell width $W_s$ extending between the third side edge 52 and the forth side edge 54. In the exemplary embodiment, the dimensions of the lower shell 24 are equal to those of the upper shell 22, except for that the lower shell 24 does not include the oil stem groove 28 and oil distribution grooves 30. However, in another embodiment, the lower shell 24 can also include the oil stem groove 28 and oil distribution groove 30.

Figure 8:
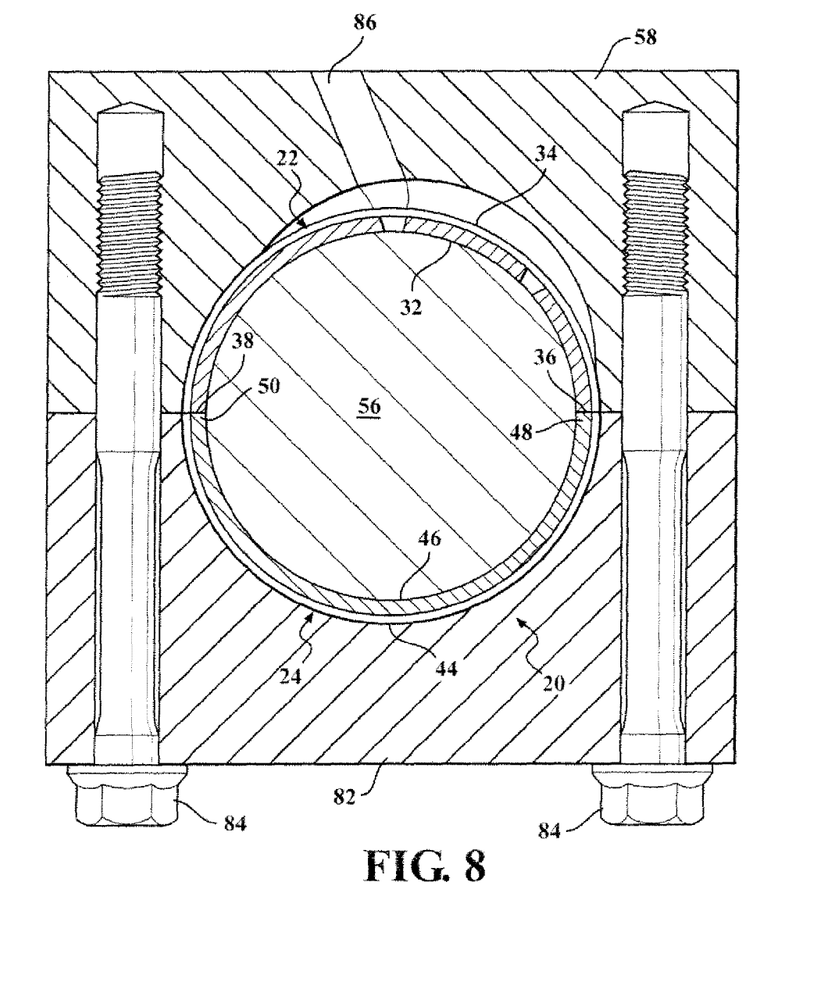
FIG. 8 is a cross-sectional view of an exemplary application of the main bearing, showing the main bearing supporting a crankshaft of an internal combustion engine.

An exemplary application of the main bearing 20 is shown in FIG. 8. illustrating the main bearing 20 supporting a crankshaft 56 disposed in a cylinder block 58 of an internal combustion engine. The upper shell 22 and the lower shell 24 are pressed together at the shell ends 36, 38, 48, 50 and positioned in a predetermined orientation relative to one another. The first shell end 36 of the upper shell 22 abuts the third shell end 48 of the lower shell 24 and the second shell end 38 of the upper shell 22 abuts the forth shell end 50 of the lower shell 24. Each of the shells 22, 24 are arcuate between the shell ends 36, 38, 48, 50. The inner surfaces 32, 46 of the shells 22, 24 are flush with one another and the outer surfaces 34, 44 of the shells 22, 24 are flush with one another. The inner surfaces 32, 46 of the shells 22, 24 present a concave cross-section between the respective side edges 40, 42, 52, 54 and the outer surfaces 34, 44 of the shells 22, 24 present a convex cross-section between the respective side edges 40, 42, 52, 54. The first side edge 40 of the upper shell 22 is circumferentially aligned with the third side edge 52 of the lower shell 24 and the second side edge 38 of the upper shell 22 is circumferentially aligned with the forth side 50 edge of the lower shell 22.

In the exemplary embodiment, the shells 22, 24 include tabs 62, which are used to conveniently position the shells 22, 24 in the predetermined orientation relative to one another and relative to the cylinder block 58. The tabs 62 are formed during the manufacturing process by pressing the inner surfaces 32, 46 outward, which consequently forms indentations 60 in the inner surfaces 32, 46. The indentations 60 are recessed radially in the respective inner surfaces 32, 46. The indentation 60 of the upper shell 22 is located at the second shell end 38 and the indentation 60 of the lower shell 24 is located at the forth shell end 50.

As shown in FIGS. 1, 2, 5 and 6, the upper shell 22 and the lower shell 24 each include one of the tabs 62 extending transversely from the outer surfaces 34, 44 and vertically aligned with the indentations 60 of the respective shells 22, 24. The upper shell 22 includes the tab 62 at the second shell end 38 and the lower shell 24 includes the tab 62 at the forth shell end 50. When the shells 22, 24 are pressed together, the indentations 60 and the tabs 62 are radially aligned with those of the other shell 22, 24. The tabs 62 can be received in the cylinder block 58 or sheared off after the shells 22, 24 are appropriately positioned in the cylinder block 58.

The upper shell 22 of the main bearing 20 includes at least one oil inlet 64 extending from the upper outer surface 34 through the upper shell 22 and to the upper inner surface 32, as shown in FIG. 1. Although not shown, the lower shell 24 of the main bearing 20 can also includes at least one oil inlet 64 extending from the lower outer surface 44 through the lower shell 24 and to the lower inner surface 46. The lubricating oil supplied by an oil pump (not shown) passes through the oil inlets 64 to the inner surfaces 32, 46 of the main bearing 20.

The upper shell 22 and the lower shell 24 of the main bearing 20 each include the oil supply groove 26, as shown in FIGS. 1, 2, 5, and 6. The oil supply grooves 26 are recessed radially into the inner surfaces 32, 46 of the shells 22, 24 and extend circumferentially and continuously along the inner surfaces 32, 46 of the shells 22, 24 between the opposite shell ends 36, 38, 48, 50. The oil supply grooves 26 extend across the oil inlets 64 so that the lubricating oil provided through the oil inlets 64 can flow along the oil supply grooves 26 and over the entire inner surfaces 32, 46 of the main bearing 20. The oil supply grooves 26 are circumferentially aligned with one another when the upper shell 22 and lower shell 24 are pressed together so that the oil supply groove 26 of the upper shell 22 is continuous and in fluid communication with the oil supply groove 26 of the lower shell 24. The oil supply grooves 26 of the shells 22, 24 are spaced from and disposed centrally between the respective side edges 40, 42, 52, 54. Each oil supply groove 26 includes a pair of supply groove side walls 66 extending from the inner surfaces 32, 46 to a supply groove bottom surface 68. As shown in FIGS. 3 and 7, the supply groove side walls 66 are ramped in a direction inward from the side edges 40, 42, 52, 54 of the shells 22, 24 and the supply groove bottom surfaces 68 are generally flat. The oil supply grooves 26 are recessed to a first depth $d_1$ at the supply groove bottom surfaces 68. The first depth $d_1$ can vary depending on the engine design and the desired amount of lubrication. In the exemplary embodiment, the first depth $d_1$ is about 0.5 millimeters to about 2.0 millimeters, preferably about 1.0 millimeter. The oil supply grooves 26 also have a supply groove width $w_{supply}$ extending generally parallel to the shell ends 36, 38, 48, 50. The supply groove width $w_{supply}$ can also vary, but in the exemplary embodiment, the supply groove width $w_{supply}$ is about 1.0 millimeter to about 2.0 millimeters, preferably about 1.5 millimeters.

The upper shell 22 also includes the oil stem groove 28 extending from the oil supply groove 26 toward the first side edge 40, as shown in FIGS. 1 and 2. The oil supply groove 26 is in fluid communication with the oil stem groove 28 of the upper shell 22 so that the lubricating oil can flow from the oil supply groove 26 to the oil stem groove 28. The oil stem groove 28 extends from the oil supply groove 26 at the first shell end 36 to a stem groove distal end 70, which is spaced from the first side edge 40. The oil stem groove 28 has a stem groove length $l_{stem}$ extending from the oil supply groove 26 to the stem groove distal end 70. The stem groove length $l_{stem}$ can vary depending on engine design and the desired amount of lubrication. In the exemplary embodiment, the stem groove length $l_{stem}$ is about 12 millimeters.

The oil stem groove 28 extends oblique to the oil supply groove 26 to present a first angle $\alpha_1$ between the oil supply groove 26 and the oil stem groove 28 and to present a second angle $\alpha_2$ between the oil stem groove 28 and the first shell end 36, as shown in FIG. 2. The first angle $\alpha_1$ and the second angle $\alpha_2$ can vary, depending on the engine design and the area of high wear. However, in the exemplary embodiment, the first angle $\alpha_1$ and the second angle $\alpha_2$ are acute, with the first angle $\alpha_1$ being greater than the second angle $\alpha_2$. For example, the first angle $\alpha_1$ can be about 20 degrees to about 60 degrees, preferably about 40 degrees, and the second angle $\alpha_2$ can be about 10 degrees to about 50 degrees, preferably about 30 degrees.

The oil stem groove 28 is recessed radially in the upper inner surface 32 and includes stem groove side walls 72 extending from the upper inner surface 32 to a stem groove bottom surface 74. As shown in FIG. 4, the stem groove side walls 72 are ramped in a direction inward from the first shell end 36 and the second shell end 38, and the stem groove bottom surface 74 is generally flat. The oil stem groove 28 is recessed to a second depth $d_2$ at the stem groove bottom surface 74. The second depth $d_2$ is less than the first depth $d_1$ of the oil supply groove 26. However, the second depth $d_2$ can vary depending on the engine design and desired amount of lubrication. In the exemplary embodiment, the second depth $d_2$ is about 0.1 millimeters to about 0.5 millimeters, preferably about 0.3 millimeters. The oil stem groove 28 has a stem groove width $w_{stem}$ extending at a slight angle relative to the first side edge 40 and the second side edge 42 of the upper shell 22. The stem groove width $w_{stem}$ is less than the supply groove width $w_{supply}$, but can also vary depending on engine design and the desired amount of lubrication. In the exemplary embodiment, the stem groove width $w_{stem}$ is about 0.7 millimeters to about 2.0 millimeters, preferably about 1.2 millimeters.

The upper shell 22 also includes a plurality of the oil distribution grooves 30 extending from the oil stem groove 28 and along the oil supply groove 26. In the exemplary embodiment, the upper shell 22 includes a pair of the oil distribution grooves 30 so that together the oil grooves 26, 28, 30 present an F-shape on the upper inner surface 32 of the main bearing 20, as shown in FIGS. 1 and 2. However, the upper shell 22 can include a single oil distribution groove 30 or more than two oil distribution grooves 30. The oil distribution grooves 30 are in fluid communication with the oil stem groove 28 and one another so that the lubricating oil can flow from the oil stem groove 28 to the oil distribution grooves 30. The oil distribution grooves 30 extend parallel to and are spaced from the oil supply groove 26. The oil distribution grooves 30 are also spaced from one another. The oil distribution grooves 30 are disposed between the oil supply groove 26 and the first side edge 40 of the upper shell 22.

Each of the oil distribution grooves 30 extend from the oil stem groove 28 to a distribution groove distal end 76. In the exemplary embodiment, one of the oil distribution grooves 30 extends from the stem groove distal end 70 and the other one of the oil distribution grooves 30 extends from the oil stem groove 28 between the oil supply groove 26 and the stem groove distal end 70. Each of the oil distribution grooves 30 have a distribution groove length $l_{dist}$ extending from the oil stem groove 28 to the distribution groove distal end 76, as shown in FIG. 2. The distribution groove length $l_{dist}$ of the oil distribution grooves 30 can vary depending on engine design and the desired amount of lubrication. In the exemplary embodiment, the distribution groove length $l_{dist}$ is about equal to one third or less than one half of the shell length $L_s$, or about 20.0 millimeters to about 30.0 millimeters, preferably about 23.0 millimeters. Each of the oil distribution grooves 30 have a distribution groove width $w_{dist}$ extending generally parallel to the first shell end 36 and second shell end 38 of the upper shell 22. In the exemplary embodiment, the distribution groove width $w_{dist}$ is less than the supply groove width $w_{supply}$ and slightly less than the stem groove width $w_{stem}$. In the exemplary embodiment, the distribution groove width $w_{dist}$ is about 0.5 millimeters to about 1.5 millimeters, preferably about 1.0 millimeter.

The oil distribution grooves 30 are recessed radially into the upper inner surface 32 of the upper shell 22. Each of the oil distribution grooves 30 include distribution groove side walls 78 extending from the upper inner surface 32 to a distribution groove bottom surface 80. As shown in FIG. 3, the distribution groove side walls 78 are ramped in a direction inward from the first side edge 40 and the second side edge 42, and the distribution groove bottom surfaces 80 are generally flat. Each of the oil distribution grooves 30 are recessed to a third depth $d_3$ at the distribution groove bottom surfaces 80. In the exemplary embodiment, the third depth $d_3$ of the oil distribution grooves 30 is less than the first depth $d_1$ of the oil supply groove 26 and equal to the second depth $d_2$ of the oil stem groove 28.

As stated above, the oil grooves 26, 28, 30 of the main bearing 20 are preferably disposed in an area of high wear along the upper inner surface 32, which depends on engine configuration, but typically includes an area on which the crankshaft 56 is pressed when the engine is idle or stopped. For example, the position of the oil grooves 26, 28, 30 along the upper inner surface 32 can be shifted closer to the second shell end 38 to best cover the area of high wear. The F-shape design of the oil grooves 26, 28, 30 shown in FIGS. 1 and 2 provides exceptional lubrication in the area typically contacted by the crankshaft 56 and subject to high wear. The configuration of the oil grooves 26, 28, 30 is such that the oil grooves 26, 28, 30 can contain a significant amount of the lubricating oil, while maximizing the non-grooved surface area of the upper inner surface 32, so that the main bearing 20 provides adequate strength and load bearing capacity.

As stated above, the exemplary application illustrated in FIG. 8 includes the main bearing 20 supporting the crankshaft 56 of the internal combustion engine. A bearing cap 82 is secured to the cylinder block 58 by a pair of bolts 84 to provide a housing for the main bearing 20 and the crankshaft 56. The tabs 62 are used to position the main bearing 20 in the cylinder block 58. FIG. 8 shows the main bearing 20 disposed in the housing of the cylinder block 58 and the crankshaft 56 resting on the lower inner surface 46 of the lower shell 24. The shell length $L_s$ of the main bearing 20 is slightly longer than the length of the housing. Thus, the assembled main bearing 20 has a "crush height" creating a hoop stress to retain the shells 22, 24 of main bearing 20 in position relative to one another.

The cylinder block 58 includes an oil passageway 86 extending from the oil pump (not shown) to an opening adjacent the main bearing 20. The lubricating oil is provided by the oil pump and flows through the oil passageway 86 to the space adjacent the main bearing 20. In the exemplary application of the main bearing 20, the oil pump provides the lubricating oil when the engine is running, but not when the engine is stopped or idle. The lubricating oil flows from the space adjacent the bearing 20 through the oil inlets 64 to the oil grooves 26, 28, 30 and over the inner surfaces 32, 46 of the main bearing 20. As stated above, the oil grooves 26, 28, 30 are in fluid communication with one another so that the lubricating oil provided through the oil inlets 64 can flow from the oil supply groove 26, to the oil stem groove 28, and to the oil distribution grooves 30. However, there is a short delay before the lubricating oil provided by the oil pump reaches the inner surfaces 32, 46 of the main bearing 20.

When the engine idles or stops, the lubricating oil slowly drains off the side edges 52, 52 of the shells 22, 24, but a residual amount of lubricating oil will remain in all the oil grooves 26, 28, 30, unless the engine is stopped for a substantial amount of time, in which case the lubricating oil only remains in the oil supply groove 26 of the lower shell 24. The lubricating oil retained in the oil stem groove 28 and the oil distribution grooves 28 of the upper shell 22 lubricates the area prone to high wear when the engine is idle or stopped.

At startup, or when the engine restarts, the rotation of the crankshaft 56 immediately draws the lubricating oil maintained in the oil supply groove 26 of the lower shell 24 to the upper inner surface 32 of the upper shell 24. The lubricating oil drawn to the upper shell 22 will flow into the oil stem groove 28 and the oil distribution grooves 30, and the grooves 26, 28, 30 will immediately direct the lubricating oil to the area of high wear. Thus, the area of high wear is adequately lubricated while the engine idles or stops and at startup, without delay.

The main bearing 20 experiences less wear and has a longer useful life, relative to main bearings 20 of the prior art without oil grooves or with oil grooves having another configuration. The advantage of adequate lubrication at startup is especially beneficial when the main bearing 20 is used in hybrid and electric vehicles because of the frequent stopping and starting, as well as the high rotation speed of the crankshaft 56 at startup.

Obviously, many modifications and variations of the present invention are possible in light of the above teachings and may be practiced otherwise than as specifically described while within the scope of the appended claims.

What is claimed is:

1. A main bearing (20) for an internal combustion engine comprising:
an upper shell (22) including an upper inner surface (32) extending circumferentially between a first shell end (36) and a second shell end (38) and radially between a first side edge (40) and a second side edge (42), said upper shell (22) presenting a shell length ($L_s$) extending circumferentially from said first shell end (36) to said second shell end (38);
a lower shell (24) including a lower inner surface (46) extending circumferentially between a third shell end (48) and a fourth shell end (50);
said first shell end (36) of said upper shell (22) abutting said third shell end (48) of said lower shell (24) and said second shell end (38) of said upper shell (22) abutting said fourth shell end (50) of said lower shell (24);
said upper shell (22) and said lower shell (24) each including an oil supply groove (26) extending circumferentially along said inner surfaces (32, 46);
said upper shell (22) including an oil stem groove (28) extending obliquely from said oil supply groove (26) to a stem groove distal end (70) spaced from said first side edge (40); and
said upper shell (22) including a pair of oil distribution grooves (30) each extending from said oil stem groove (28) along said oil supply groove (26) to a distribution groove distal end (76), each of said oil distribution grooves (30) presenting a distribution groove length ($l_{dist}$) extending from said oil stem groove (28) to said distribution groove distal end (76), wherein the distribution groove length ($l_{dist}$) is one third to not greater than one half of said shell length ($L_s$).

2. The main bearing (20) of claim 1, wherein said oil supply groove (26) and said oil stem groove (28) present a first angle ($\alpha_1$) being less than ninety degrees therebetween.

3. The main bearing (20) of claim 2, wherein said oil stem groove (28) extends from said oil supply groove (26) at said first shell end (36) of said upper shell (22).

4. The main bearing (20) of claim 3, wherein said oil stem groove (28) and said first shell end (36) presents a second angle ($\alpha_2$) therebetween and said second angle ($\alpha_2$) is less than said first angle ($\alpha_1$).

5. The main bearing (20) of claim 4, wherein said first angle ($\alpha_1$) is from 20 degrees to 60 degrees and said second angle ($\alpha_2$) is from 10 degrees to 50 degrees.

6. The main bearing (20) of claim 1, wherein one of said oil distribution grooves (30) extends from said oil stem groove (28) at said stem groove distal end (70).

7. The main bearing (20) of claim 1, wherein said oil distribution grooves (30) extending from said oil stem groove (28) extend parallel to said oil supply groove (26) of said upper shell (22).

8. The main bearing (20) of claim 1, wherein said oil distribution grooves (30) are spaced from and parallel to said oil supply groove (26) of said upper shell (22).

9. The main bearing (20) of claim 1, wherein said oil supply groove (26) is recessed to a first depth ($d_1$) and said oil stem groove (28) is recessed to a second depth ($d_2$) and said oil distribution grooves (30) are recessed to a third depth ($d_3$) and said second depth ($d_2$) and said third depth ($d_3$) are less than said first depth ($d_1$).

10. The main bearing (20) of claim 1, wherein said oil supply groove (26) has a supply groove width ($w_{supply}$) and said oil stem groove (28) has a stem groove width ($w_{stem}$) being less than said supply groove width ($W_{supply}$).

11. The main bearing (20) of claim 1, wherein said oil supply groove (26) has a supply groove width ($w_{supply}$) and each of said oil distribution grooves (30) have a distribution groove width ($w_{dist}$) being less than said supply groove width ($W_{supply}$).

12. The main bearing (22) of claim 1, wherein said oil supply groove (26) of said upper shell (22) is circumferentially aligned and in fluid communication with said oil supply groove (26) of said lower shell (24).

13. The main bearing (22) of claim 1, wherein said oil supply groove (26) and said oil stem groove (28) and said oil distribution grooves (30) of said upper shell (22) are in fluid communication with one another.

14. The main bearing (20) of claim 1, wherein said upper inner surface (32) presents a concave cross section between said first side edge (40) and said second side edge (42) and said lower inner surface (46) of said lower shell (24) presents a concave cross section between said third side edge (52) and said fourth side edge (54).

15. The main bearing (20) of claim 1, wherein said upper shell (22) includes an oil inlet (64) disposed along said oil supply groove (26) and extending through said upper shell (22) from said upper outer surface (34) to said upper inner surface (32).

16. The main bearing (20) of claim 15, wherein said oil supply groove (26) is in fluid communication with said oil inlet (64).

17. The main bearing (20) of claim 1, wherein said first shell end (36) of said upper shell (22) is secured to said third shell end (48) of said lower shell (24); and said second shell end (38) of said upper shell (22) is secured to said fourth shell end (50) of said lower shell (24).

18. A main bearing (20) for an internal combustion engine comprising:
an upper shell (22) including an upper inner surface (32) having a shell length ($L_s$) extending circumferentially between a first shell end (36) and a second shell end (38) opposite said first shell end (36);
said upper shell (22) extending radially between a first side edge (40) and a second side edge (42);
a lower shell (24) including a lower inner surface (46) extending circumferentially between a third shell end (48) and a fourth shell end (50);
said first shell end (36) of said upper shell (22) abutting said third shell end (48) of said lower shell (24) and said second shell end (38) of said upper shell (22) abutting said fourth shell end (50) of said lower shell (24);
said upper shell (22) and said lower shell (24) each including an oil supply groove (26) extending circumferentially along said inner surfaces (32, 46);
said oil supply groove (26) extending along said shell length ($L_s$) of said upper inner surface (32) and disposed centrally between said first side edge (40) and said second side edge (42);
said upper shell (22) including an oil stem groove (28) extending obliquely from said oil supply groove (26) at said first shell end (36) to a stem groove distal end (70) spaced from said first side edge (40);
said oil stem groove (28) presenting a first angle ($\alpha_1$) between said oil supply groove (26) and said oil stem groove (28) and a second angle ($\alpha_2$) between said oil stem groove (28) and said first shell end (36);
each of said angles ($\alpha_1$, $\alpha_2$) being acute;
said upper shell (22) including a pair of oil distribution grooves (30) each having a distribution groove length ($l_{dist}$) extending from said oil stem groove (28) to a distribution groove distal end (76);
each of said oil distribution grooves (30) extending parallel to and spaced from said oil supply groove (26);
said distribution groove length ($l_{dist}$) being one third to not greater than one half of said shell length ($L_s$); and
one of said oil distribution grooves (30) extending from said stem groove distal end (70) and the other one of said oil distribution grooves (30) extending from said oil stem groove (28) between said oil supply groove (26) and said stem groove distal end (70) so that said oil stem groove (28) and said oil distribution grooves (30) present an F-shape along said upper inner surface (32).

19. The main bearing (20) of claim 1, wherein said upper inner surface (46) presents a surface area including said oil supply groove (26) and said oil stem groove (28) and said pair of oil distribution grooves (30), and wherein the remaining portion of said surface area is without oil grooves.

* * * * *

UNITED STATES PATENT AND TRADEMARK OFFICE
CERTIFICATE OF CORRECTION

PATENT NO.          : 8,608,385 B2                                    Page 1 of 1
APPLICATION NO.     : 13/110482
DATED               : December 17, 2013
INVENTOR(S)         : Ovares et al.

It is certified that error appears in the above-identified patent and that said Letters Patent is hereby corrected as shown below:

In the Specification

Column      Line
3           51              "thickness tin" should read "thickness t in"

Signed and Sealed this
Thirteenth Day of May, 2014

Michelle K. Lee
*Deputy Director of the United States Patent and Trademark Office*